2,950,334
PROCESS OF PREPARING O-DIVINYLBENZENE

Arthur Clay Cope, Belmont, Mass., and Carleton Thomas Handy, Wilmington, Del., assignors to E. I. du Pont de Nemours and Company, Wilmington, Del., a corporation of Delaware No Drawing. Filed Nov. 4, 1957, Ser. No. 694,123

10 Claims. (Cl. 260—669)

This invention relates to an improved method for preparing o-divinylbenzene.

Although o-divinylbenzene is a promising intermediate to a variety of addition polymers, commercial realization of this utility has been hampered by the fact that no method has heretofore been available by which the compound could be made accessible in large volume at a low enough cost. An object of this invention is to make o-divinylbenzene from abundantly available, low cost precursors.

According to this invention, o-divinylbenzene is obtained by reacting acetylene with divinylacetylene in the presence of a complex of nickel carbonyl with an organic phosphine or phosphite at a temperature of at least 50° C. The complex has the general formula, $[(RO_m)_3-P]_yNi(CO)_{4-y}$, wherein $m$ is 0 or 1, $y$ is 1, 2, or 3, and R is a hydrocarbon radical free of aliphatic unsaturation.

In a convenient method of operation, a pressure reactor is charge with an anhydrous, liquid, inert reaction medium such as tetrahydrofuran, the catalyst, e.g., nickel carbonyltriarylphosphine complex, and divinylacetylene. Acetylene is added and the charge heated to between 50° and 150° C. Acetylene is periodically added to maintain the pressure at the level selected for operation throughout the reaction period. Thereafter the reaction mixture is permitted to cool, unreacted acetylene is vented to the atmosphere, and the contents discharged. The desired o-divinylbenzene is isolated from the reaction product by distillation or other methods known to those skilled in the art.

The process of this invention is carried out at temperatures which are at least 50° C. but below 150° C. The conditions which are conducive to the best yields of desired o-divinylbenzene are 75–120° C. and the process is usually carried out in this temperature range. The ratio of acetylene to divinylacetylene is not critical. Theoretically, however, two moles of acetylene per mole of divinylbenzene are required for the formation of the divinylbenzene. Although the mole ratio of acetylene to divinylacetylene may be as high as 20:1 or even higher, such high ratios are generally avoided because they favor the competing trimerization reaction of the acetylene to benzene and thereby reduce the yield of desired o-divinylbenzene.

The process of this invention can be operated at atmospheric pressure. However, since the use of superatmospheric pressures is conducive to improved reaction rates and yields, as generally operated, the process is effected at pressures which are at least about 50 lb./sq.in. The best results are realized using pressures in excess of 80 lb./sq.in. and such pressure conditions are generally employed. In a batch operation, it is preferred to pressure with acetylene at ordinary temperatures, heat to the temperature selected for operation, and then add acetylene as required to attain the desired pressure. The pressure within the reactor is maintained by periodic injections of acetylene. In order to minimize explosion hazards it is desirable to maintain a total pressure below 500 lb./sq.in.

The use of an anhydrous inert reaction medium is desirable to bring about better contact between reactants. Suitable anhydrous inert liquid reaction media are tetrahydrofuran, benzene, xylene, acetonitrile, and the like, and the amount used can equal or exceed the combined weights of divinylacetylene and acetylene by 10- or more fold.

The catalysts which are specifically effective are complexes of nickel carbonyl with phosphines, $R_3P$, or phosphites, $(RO)_3P$, wherein R is a hydrocarbon radical free of aliphatic unsaturation, e.g., alkyl, aryl, or cycloalkyl preferably of not more than seven carbon atoms and correspond generically to $[(RO_m)_3P]_yNi(CO)_{4-y}$ wherein $m$ is 0 or 1 and $y$ is 1, 2, or 3. The nickel carbonylphosphine complexes having the formula $(R_3P)_2Ni(CO)_2$ and the nickel carbonylphosphite complexes corresponding to $[(RO)_3.P]_2Ni(CO)_2$ are most stable. The preparation of the latter is described in J. Chem. Soc. 1954, 1940. The preparation of the former is described in Ann. 560, 104 (1948). These catalysts are generically described by the formula $[(RO_m)_3P]_2Ni(CO)_2$, wherein $m$ is 0 or 1 and R is as described above. They are prepared by the combination, with evolution of two moles of CO, of two moles of the phosphine or the phosphite with one mole of nickel carbonyl. Examples of such organo-phosphorus compounds are bis(triphenylphosphite)nickel dicarbonyl, bis(tritolylphosphite)nickel dicarbonyl, bis(trimethylphosphite)nickel dicarbonyl, bis(tricyclohexylphosphite)nickel dicarbonyl, bis(tribenzylphosphite)nickel dicarbonyl, bis(tributylphosphine)nickel dicarbonyl, bis(triphenylphosphine)nickel dicarbonyl, bis(tribenzylphosphine)nickel dicarbonyl, triphenylphosphine nickel tricarbonyl, triphenylphosphite nickel tricarbonyl, etc. In general, bis(triarylphosphite)nickel dicarbonyls and bis(triarylphosphine)nickel dicarbonyls and tricarbonyls are preferred because of their good catalytic activity.

In batch operation the amount of catalyst can be from 0.2 to 10 grams per mole of divinylacetylene charged but since good results are obtained with amounts varying from 0.5–3 grams of catalyst per mole of divinylacetylene, that is the amount which is generally used. In a continuous or semi-continuous process the amount of catalyst can equal or exceed the amount of divinylacetylene being processed at any one time.

The time of reaction depends upon such interdependent factors as type and amount of catalyst, temperature and pressure conditions, etc. The reaction is usually carried on until a predetermined amount of acetylene has been added to the reactor.

Although in the laboratory, the process is carried out as a batch operation, as illustrated, it is to be understood that as a practical commercial operation, semi-continuous or continuous operation would be preferred. Such operation permits removal of reactive products from the reaction zone, control of the relative proportion of reactants, and the maintenance of high effective catalyst concentrations.

The examples which follow illustrate but do not limit the invention.

Example I

A pressure vessel of 80 ml. capacity was charged with 5 ml. (0.05 mole) of divinylacetylene, 0.5 g. of triphenylphosphinenickel tricarbonyl, and 25 ml. of tetrahydrofuran. The reactor was cooled, evacuated, placed in a barricaded shaker box and 1 g. of acetylene was added. The reactor was warmed to 90° C. and additional acetylene was added to produce a total pressure of 190 lb./sq. in. A rapid pressure drop was obtained and additional acetylene was added in 1 g. increments to maintain a positive pressure of acetylene. A total of 10 g. of acetylene was injected during 3.1 hours at 90° C. The contents of the reactor were concentrated at 200 mm. from a bath heated to 75° C., removing unreacted divinylacetylene and by-product benzene. The residue was distilled at 6 mm. to separate two fractions: I, B.P. 54–63° C., $n_D^{25}$ 1.5703, 0.50 g., and a higher boiling fraction. Inspection of the data for fraction I and an examination of its infrared absorption spectrum established it as the known o-divinylbenzene.

*Example II*

A pressure vessel having an internal volume of 400 ml. was charged with 25 ml. (0.25 mole) of divinylacetylene, 1.0 g. of triphenylphosphinenickel tricarbonyl and 60 ml. of tetrahydrofuran. The reactor was cooled, evacuated and 5 g. of acetylene was injected. The reactor was warmed to 85° C. and additional acetylene was added periodically to maintain pressure in the range of 150–200 lb./sq. in. A total of 40.3 g. of acetylene was injected during 7 hours at 85–100° C. When the vessel was vented, gases equivalent to 5.0 g. of acetylene was recovered. The liquid product was separated from a small amount of dark amorphous solid and distilled under reduced pressures. The following fractions were collected:

(a) B.P. 30–33° C./140 mm. _____ 17.4 g. $n_D^{25}$ 1.4492
(b) B.P. 32–35° C./7 mm. _____ 9 g. $n_D^{25}$ 1.5424
(c) B.P. 61–65° C./7 mm. _____ 10.0 g. $n_D^{25}$ 1.5737
(d) B.P. 45–50° C./1 mm. _____ 1.8 g. $n_D^{25}$ 1.5756
    Residue—4.0 g. brittle resin Fraction (a) is largely by-product benzene. Raman spectral analysis of Fraction (b) gave little evidence for unreacted divinylacetylene. Fractions (c) and (d) represent o-divinylbenzene and correspond to a 36% conversion based on divinylacetylene.

*Example III*

A 400-ml. pressure vessel was charged with 0.1 g. of triphenylphosphinenickel tricarbonyl, 110 ml. of tetrahydrofuran, 12.5 ml. (0.125 mole) of divinylacetylene and 5 g. of acetylene. The vessel was warmed to 80° C. The pressure was increased to 200 lb./sq. in. by injection of additional acetylene. The pressure decreased as the reaction took place, requiring periodic injections of additional acetylene. The temperature was allowed to rise to 90° C. A total of 11.5 g. of acetylene was added during 6.5 hours. The vessel was cooled and vented, and 3.0 g. of unreacted acetylene was recovered. Distillation of the liquid product gave 0.8 g. of o-divinylbenzene, B.P. 55–57° C./7 mm., $n_D^{25}$ 1.5726. This corresponds to a 6% conversion.

*Example IV*

In an 80-ml. pressure vessel was placed 0.5 g. of bis-(triphenylphosphine)nickel dicarbonyl

$[(C_6H_5)_3-P]_2Ni(CO)_2$ 10 ml. (0.1 mole) of divinylacetylene, 20 ml. of purified tetrahydrofuran and 1 g. of acetylene. The vessel was warmed to 90° C. and sufficient acetylene was added to bring the pressure to 200 lb./sq. in. Additional acetylene was injected as required to keep the pressure in the range of 60–200 lb./sq. in. The temperature was held at 90–99° C. A total of 11 g. of acetylene was injected during an 8-hour reaction period. The reactor was cooled and the contents filtered to separate a small amount of an amorphous solid. The filtrate was distilled to give 2.82 g. of o-divinylbenzene (22% conversion).

*Example V*

Example IV was repeated, using 0.5 g. of triphenylphosphitenickel tricarbonyl as a catalyst. A small acetylene uptake was accomplished during 13 hours at 95° C. and 200 lb./sq. in. pressure. The product was separated from a small amount of solid by filtration and the filtrate diluted with dioxan and hydrogenated over a palladium catalyst. A total of 0.11 mole of hydrogen was absorbed. Distillation yielded 0.5 g. of 1,2-diethylbenzene (B.P. 74° C./10 mm., $n_D^{25}$ 1.5071).

*Example VI*

An 80-ml. pressure vessel was charged with 0.5 g. of triphenylphosphinenickel tricarbonyl, 10 ml. (0.1 mole) of divinylacetylene, 20 ml. of acetonitrile and 1 g. of acetylene. The vessel was warmed to 86° C. and additional acetylene was added to bring the total pressure to 200 lb./sq. in. A rapid reaction ensued and acetylene was injected portion-wise to keep the pressure within the range of 150–200 lb./sq. in. The temperature was maintained at 86–88° C. A total of 10 g. of acetylene was injected during 1.7 hours. Filtration and distillation gave 1.55 g. (12% conversion based on divinylacetylene) of o-divinylbenzene (B.P. 62–70° C./8 mm., $n_D^{25}$ 1.5748).

*Example VII*

An 80-ml. pressure vessel was charged with 0.5 g. of bis(triphenylphosphine)nickel dicarbonyl, 10 ml. (0.1 mole) of divinylacetylene, 20 ml. of benzene and 1.0 g. of acetylene. The vessel was warmed to 90° C. and pressured to 200 lb./sq. in. with acetylene. The temperature and pressure were maintained at these levels for 8 hours. During this period a total of 9.8 g. of acetylene was added. The vessel was cooled, vented and the product separated from a small amount of solid by filtration. The filtrate was diluted with dioxane and hydrogenation using a Pd./Pt. catalyst at 30° C. and 40 lb./sq. in. of hydrogen. The absorption corresponded to 0.1 mole of hydrogen. Distillation gave 3.5 g. (26% conversion) of o-diethylbenzene (B.P. 60–62° C./10 mm., $n_D^{25}$ 1.5029).

o-Divinylbenzene readily undergoes free radical polymerization, as illustrated in the example which follows:

A solution of 1 ml. of o-divinylbenzene and 0.02 ml. of tert.-butyl peroxide in 9 ml. of chlorobenzene was warmed at reflux (132° C.) under nitrogen for 7.5 hours. The resulting polymer solution was poured into 50 ml. of methanol to separate the polymer as a white solid (0.17 g.), which was readily soluble in benzene. Infrared analysis showed absorption attributable to both vinyl and polystyrene units indicating that only one of the two vinyl groups of o-divinylbenzene is involved in the polymerization process.

The ability of o-divinylbenzene to form soluble, fusible copolymers which can be rendered insoluble and infusible in a second stage polymerization makes it valuable as a modifier for thermoplastic resins. For example, polystyrenes having markedly decreased solubility and improved hardness are obtained by incorporating into the styrene a small amount of o-divinylbenzene.

This invention makes the potentially important polymerizable monomer, o-divinylbenzene, available from abundantly available, low cost reactants, and therefore represents a valuable contribution.

We claim:

1. A method for preparing o-divinylbenzene which comprises reacting acetylene with divinylacetylene in the presence of a nickel carbonyl complex of the general formula $[(RO_m)_3P]_yNi(CO)_{4-y}$, wherein $m$ is a cardinal number not greater than 1, $y$ is an integer of from 1 to 3, and R is a hydrocarbon radical free of aliphatic unsaturation.

2. The process of claim 1 wherein the reaction is carried out at a temperature of at least 50° C.

3. The process of claim 1 wherein the reaction is carried out at a temperature of from 75–120° C.

4. The process of claim 1 which is carried out at a pressure greater than 50 lb./sq. in.

5. The process of claim 1 which is carried out in the presence of tetrahydrofuran.

6. A method of preparing o-divinylbenzene which comprises condensing acetylene with divinylacetylene in the presence of a catalytic amount of triphenylphosphine-nickel tricarbonyl at a temperature of at least 50° C. and at a pressure above 50 lb./sq. in.

7. The process of claim 6 wherein the mole ratio of acetylene to divinylacetylene is at least 2:1.

8. The process of claim 6 which is effected at a temperature of from about 75–120° C.

9. A method of preparing o-divinylbenzene which comprises condensing acetylene with divinylacetylene in the presence of a catalytic amount of bis(triphenylphosphine)nickel dicarbonyl at a temperature of at least 50° C. and at a pressure above 50 lb./sq. in.

10. A method of preparing o-divinylbenzene which comprises condensing acetylene with divinylacetylene in the presence of a catalytic amount of triphenylphosphite-nickel tricarbonyl at a temperature of at least 50° C. and at a pressure above 50 lb./sq. in.

References Cited in the file of this patent
UNITED STATES PATENTS

| | | |
|---|---|---|
| 2,207,071 | Reppe et al. | July 9, 1940 |
| 2,723,299 | Tanaka et al. | Nov. 8, 1955 |